(12) United States Patent
Robinson et al.

(10) Patent No.: US 8,315,472 B2
(45) Date of Patent: Nov. 20, 2012

(54) SYSTEM AND METHOD FOR REDUCING DIMENSIONALITY OF HYPERSPECTRAL IMAGES

(75) Inventors: Ian S. Robinson, Redondo Beach, CA (US); Anthony M. Sommese, Eatons Neck, NY (US)

(73) Assignee: Raytheon Company, Waltham, MA (US)

( * ) Notice: Subject to any disclaimer, the term of this patent is extended or adjusted under 35 U.S.C. 154(b) by 813 days.

(21) Appl. No.: 12/475,145

(22) Filed: May 29, 2009

(65) Prior Publication Data

US 2010/0303371 A1  Dec. 2, 2010

(51) Int. Cl.
*G06K 9/40* (2006.01)
(52) U.S. Cl. ....................................................... 382/254
(58) Field of Classification Search .................. 356/303, 356/326; 707/637, E17.121, 999.02, 957, 707/E17.056; 702/155; 382/221, 254; 708/308, 708/401, 424; 73/74; 700/28, 31
See application file for complete search history.

(56) References Cited

U.S. PATENT DOCUMENTS

| | | | |
|---|---|---|---|
| 6,665,438 B1 | 12/2003 | Lin | |
| 6,701,021 B1 | 3/2004 | Qian et al. | |
| 6,750,964 B2 | 6/2004 | Levenson et al. | |
| 6,782,138 B1 | 8/2004 | Leisner et al. | |
| 6,804,400 B1 | 10/2004 | Sharp | |
| 6,940,999 B2 | 9/2005 | Lin | |
| 6,952,499 B1 | 10/2005 | Vititoe | |
| 7,194,111 B1 | 3/2007 | Schaum et al. | |
| 7,251,376 B2 | 7/2007 | Qian et al. | |
| 2009/0074297 A1 | 3/2009 | Robinson | |

OTHER PUBLICATIONS

Ian S. Robinson, et al. "Comparison of Hyperspectral Sub-Pixel Detection With and Without a Priori Knowledge of Target Features." Aerospace Conference, 1998 IEEE Snowmass at Aspen, Colorado, Mar. 21-28, 1998; vol. 5, pp. 183-189; Mar. 21, 1998; XP010287059; ISBN 978-0-7803-4311-5.*

Sun, L., et al., "Improved Iterative ERror Analysis for Endmember Extraction from Hyperspectral Imagery", SPIE Imaging Spectrometry XIII, vol. 708, pp. 400-407, Intro., Sec. 2.2—pp. 3-5 (Aug. 2008).

Rogge, D. M., et al., "Iterative Spectral Unmixing for Optimizing Per-Pixel Endmember Sets", IEEE Transactions on Geoscience and Remote Sensing, IEEE Service Center, vol. 44, No. 12, pp. 3725-3736 (Dec. 2006).

Veganzones, M. A., et al., "Endmember Extraction Methods: A Shrot Review", pp. 400-407 (Sep. 2008).

(Continued)

*Primary Examiner* — Gregory F Cunningham
(74) *Attorney, Agent, or Firm* — Pierce Atwood LLP; Joseph M. Maraia (57) ABSTRACT

A method for reducing dimensionality of hyperspectral images may include receiving a hyperspectral image having a plurality of pixels. A basis vector set including a number of members may then be established, wherein each of the members comprises a basis vector. For each of the plurality of pixels, a spectral vector for the pixel may be read and decomposed with the members of the basis vector set to derive a residual vector for the pixel. A basis vector for the pixel may then be added to the members of the basis vector set if the residual vector for the pixel has a magnitude exceeding a predetermined threshold, and the basis vector set may then be optimized to eliminate one of the members of the basis vector set, whereby the optimized basis vector set includes the number of members. A system configured to perform the method may also be provided.

5 Claims, 8 Drawing Sheets

OTHER PUBLICATIONS

PCT/US2010/024192 filed Feb. 12, 2010, Partial Intl. Search Report dated Feb. 21, 2011 (9 pages).

Duran, O., et al., "A Time-Efficient Method for Anomaly Detection in Hyperspectral Images", IEEE Transactions on Geoscience and Remote Sensing, IEEE Service Ctr., NJ, US, vol. 45, No. 12, pp. 3894-3904 (Dec. 2007).

Plaza, A., et al., "Spatial/Spectral Endmember Extraction by Multidimensional Morphological Operations", IEEE Transactions on Geoscience and Remote Sensing, IEEE Service Ctr,, NJ, US, vol. 40, No. 9, pp. 2025-2029 (Sep. 2002).

Plaza, A., et al., "A New Approach to Mixed Pixel Classification of Hyperspectral imagery based on extended Morphological Profiles", Pattern Recognition, Elsevier, vol. 37, No. 6, pp. 1097-1116 (Jun. 2004).

Rogge, D. M., et al., "Integration of spatial-spectral information for the improved extraction of endmembers", Remote Sensing of Environment, Elsevier, vol. 110, No. 3, pp. 387-303 (Aug. 2007).

Filippi, A. M., et al., "Support Vector Machine-Based Endmember Extraction", IEEE Transactions on Geoscience and Remote Sensing, IEEE Service Ctr., NJ, US, vol. 47, No. 3, pp. 771-791 (Mar. 2009).

Intl Search Report & Written Opinion dated Apr. 27, 2011 of PCT/US2010/024192 filed Feb. 12, 2010 (18 pages).

International Preliminary Report on Patentability dated Aug. 29, 2011 of PCT/US2010/024192 filed Feb. 12, 2010 (21 pages).

Keshava Nirmal, et al. "Spectral Unmixing"; IEEE Signal Processing Magazine; vol. 19, No. 1; pp. 44-57; Jan. 1, 2002; XP011093745.

International Search Report for International Patent Application No. PCT/US2008/083738, dated Feb. 9, 2009.

* cited by examiner

SYSTEM AND METHOD FOR REDUCING DIMENSIONALITY OF HYPERSPECTRAL IMAGES

CROSS-REFERENCE TO RELATED APPLICATIONS

This application is related to U.S. patent application Ser. No. 11/856,588, entitled "Hyperspectral Image Dimension Reduction System and Method," filed Sep. 17, 2007, the disclosure of which is hereby incorporated by reference in its entirety.

BACKGROUND

This disclosure relates to reducing dimensionality of hyperspectral images based on an optimized set of basis vectors, and in particular, to reducing the dimensionality of hyperspectral images in multiple passes to further optimize the set of basis vectors in view of anomalous aspects of the hyperspectral images.

Black and white photographs of objects or geographic areas generally provide a two dimensional construct of the actual image or area captured in the photograph. In particular, each x-y coordinate in the two dimensional construct has a single value representing a blackness or whiteness of the particular coordinate in the captured image. As such, the human eye can perceive useful information about the objects or areas captured in black and white photographs based on differences between black, white, and/or various shades of gray. Although color photographs can add more visual information, for most purposes, the additional visual information represented in a color photograph is tied to the visual spectrum. In particular, each x-y coordinate in color photographs includes an approximation of the visual color spectrum for that particular coordinate spot, wherein the approximation is generally created by blending three color values, such as color values for red, green, and blue. As such, multispectral imaging systems (e.g., weather satellites, the Landsat Thematic Mapper remote imager, etc.) are often used in remote sensing and imaging applications, as multispectral imaging systems can capture light from frequencies beyond the visible light range (i.e., to extract additional information that the human eye may fail to perceive with receptors for red, green, and blue). For example, multispectral imaging systems may be capable of capturing infrared information in addition to information from within the visual spectrum. Even so, many multispectral imaging systems are nonetheless limited in their ability to perceive information that may otherwise be present in a different part of the visual spectrum.

Hyperspectral sensors, on the other hand, can collect image data across hundreds of spectral bands through a combination of technology associated with spectroscopy and remote imaging. As such, hyperspectral sensors can capture sufficient information to derive a contiguous spectrum for each pixel in an image. In particular, in addition to each pixel in the image having a gray or visible color value, each pixel in the image has a third dimension for a vector providing distinct information for the pixel over a large spectrum of wavelengths. Because different materials or objects tend to reflect wavelengths of visible and invisible light differently, the contiguous spectrum may be analyzed to separate and evaluate different wavelengths, thus permitting finer resolution and greater perception of information contained in the image. For example, inorganic materials such as minerals, chemical compositions and crystalline structures tend to control the shape of the spectral curve and the presence and positions of specific absorption bands. In addition, the spectral reflectance curves of healthy green plants tend to have a characteristic shape based on various attributes of the plants (e.g., absorption effects from chlorophyll and other leaf pigments), while leaf structures may vary significantly depending on plant species or plant stress. Furthermore, if a combination of different materials are present at a given pixel in the image (e.g., biological, chemical, mineral, or other materials), the particular combination will provide a composite signal that can be analyzed and compared to known signal waveforms to derive information for the materials within the pixel.

As such, hyperspectral imaging systems have a significant ability to characterize targets, materials, and changes to an image, providing a detection granularity that exceeds the actual resolution of pixels in the image and a change identification capability that does not require pixel level registration. Hyperspectral imaging systems can therefore provide benefits in a wide array of practical applications, including image based surveillance for detecting chemical or biological weapons, assessing bomb damage to underground structures, identifying drug production and cultivation sites, and detecting friendly or enemy troops and vehicles beneath foliage or camouflage, among other things. However, because each pixel in a hyperspectral image carries information for a broad spectrum of wavelengths, hyperspectral images often include vast quantities of data that require significant cost, weight, size, and power investments to store, transmit, analyze, or otherwise process the images. For example, hyperspectral sensors are often located remotely on satellites or aircraft capable of imaging areas in excess of 500×500 kilometers per hour, which may result in the hyperspectral sensors generating anywhere from three to fifteen gigabits of data per second.

Consequently, although hyperspectral sensors can capture images with increased spatial content and resolution across greater wavelength spectrums, the large data volumes introduce latency problems, particularly in cases where the data needs to be processed in near real time. For example, if a hyperspectral image corresponds to a disaster area (e.g., coast lines ravaged by a tsunami, combat zones, or targets of a terrorist strike), transferring and processing hyperspectral image data in real time may be critical to preventing loss of life and property. In addition, various applications may benefit from processing the hyperspectral image data at a location where the image is collected and subsequently transmitting results of the processing or subsets of the image data to another location for further processing. However, given the volume of data corresponding to a hyperspectral image, processing the data locally may significantly tax local resources, potentially leading to further delays in transmitting the data to other locations. Although the transmission rate for hyperspectral images can be increased using existing lossy and/or lossless compression techniques, these techniques also suffer from various drawbacks.

For example, lossy data compression generally refers to a class of data compression algorithms where data may be compressed to produce a new data set that is different from the original data set, yet close enough to the original data set to be useful for certain applications (e.g., lossy compression formats may include the JPEG image format designed to provide images that respond well to the human eye, the MP3 audio format designed to remove data that is unlikely to be perceived by the human ear, etc.). As such, lossy compression methods are typically used to produce compressed data sets that nonetheless satisfy requirements for a particular application. However, in the context of an application that processes hyperspectral images, existing lossy compression methods typically remove information that is valuable and desired. For example, compressing a hyperspectral image into a JPEG image may remove information captured from spectral bands that the human eye cannot perceived, which may undermine the ability to characterize targets, materials, or changes to scenes that are captured in hyperspectral images.

Additionally, lossless data compression generally refers to a class of data compression algorithms where an original data set may be compressed to produce a new data set, which can subsequently be decompressed to extract the original data set (i.e., the decompressed data set corresponds exactly to the original data set). Lossless compression formats are typically categorized according to the type of data the formats were designed to compress (e.g., the ZIP and GZIP file formats provide lossless compression for data, the PNG and GIF provide lossless compression for images, etc.). Although general purpose lossless compression algorithms can theoretically be used on any type of data, existing lossless compression algorithms typically cannot achieve significant compression on a different type data than that which the algorithms were designed to compress. Thus, existing lossless compression algorithms do not provide a suitable guaranteed compression factor for hyperspectral images, and in certain cases, the decompressed data set may even be larger then the original data set.

In the context of hyperspectral images, one technique that has been used to reduce the volume of data relates to reducing the dimensionality of hyperspectral images. In particular, reducing the dimensionality of a data set associated with a hyperspectral image may transform the hyperspectral image into a more compact form, with little to no loss of the most relevant information. Reducing the dimensionality of hyperspectral data is similar in concept to compressing the data, in that the volume of data is reduced, but dimensionality reduction differs from compression in that the compressed data is typically decompressed before being subject to further processing (e.g. to detect targets in a scene, identify changes in successive images of the same scene, etc.). Although dimensionality reduction can be useful in compressing the data set (e.g., to reduce the amount of data transferred to a processing node), the decompressed data typically remains quite large and requires significant computational resources when processed further. Thus, in applications where processing power may be limited or where the data must be processed very rapidly, existing dimensionality reduction techniques do not adequately enable processing of the reduced hyperspectral image data set. In other words, although existing techniques for reducing the dimensionality of hyperspectral images may enable faster transmission of the data set, the existing dimensionality reduction techniques do not alleviate the computational burdens associated with processing the decompressed data set without compromising important information in the data set.

Based on the foregoing, an apparent need exists for a system and method capable of reducing the dimensionality of hyperspectral images in a manner that overcomes one or more of the technical problems noted above.

SUMMARY

According to one aspect of this disclosure, the systems and methods for reducing dimensionality of hyperspectral images described herein may address these and other drawbacks of existing system. In particular, the systems and methods described herein may be used to reduce the dimensionality of hyperspectral images based on an optimized set of basis vectors, and further to reduce the dimensionality of hyperspectral images in multiple passes to further optimize the set of basis vectors in view of anomalies that may be present in the hyperspectral images.

According an embodiment, a method for reducing dimensionality of hyperspectral images may comprise receiving a hyperspectral image having a plurality of pixels and establishing a basis vector set that includes a predetermined number of members, wherein each of the members comprises a basis vector. For each of the plurality of pixels, a spectral vector for the pixel may be decomposed with the members of the basis vector set to derive a residual vector for the pixel. As such, a basis vector for the pixel may be added to the members of the basis vector set if the residual vector for the pixel has a magnitude exceeding a predetermined threshold. The basis vector set may then be optimized to eliminate one of the members of the basis vector set, wherein the optimized basis vector set includes the predetermined number of members. For example, optimizing the basis vector set may include rotating the members of the basis vector set away from a direction having a minimum power variance to ensure that the members of the basis vector span a subspace that contains the most power. In another example, optimizing the basis vector set may include eliminating the member of the basis vector set associated with a residual vector having a smallest magnitude.

According to an embodiment, a method for reducing dimensionality of hyperspectral images may comprise receiving a hyperspectral image having a plurality of pixels and establishing an initial basis vector set that includes a predetermined number of members, wherein each of the members comprises a basis vector. For each of the plurality of pixels, a spectral vector for the pixel may be decomposed with the members of the basis vector set to derive a residual vector for the pixel. As such, a basis vector for the pixel may be added to the members of the basis vector set if the residual vector for the pixel has a magnitude exceeding a predetermined threshold. After all of the pixels have been individually processed in this manner, the basis vector set may then be optimized to reduce the number of members in the basis vector set to the same number of members in the initial basis vector.

According to an embodiment, a method for reducing dimensionality of hyperspectral images in multiple passes may comprise receiving an initial basis vector set that includes a plurality of members for a hyperspectral image having a plurality of pixels, wherein the initial set of basis vectors may correspond to a reduced data set for the hyperspectral image. A plurality of pixels in the reduced data set may then be segregated into anomalous pixels and common pixels based on the initial basis vector set. For example, segregating the plurality of pixels in the reduced data set into the anomalous pixels and the common pixels may include unmixing each of the pixels in the reduced data set with the plurality of members in the initial basis vector set to produce a residual vector and a fitting coefficient with respect to each of the members in the initial basis vector set for each of the unmixed pixels. The unmixed pixels may then be analyzed to identify any of the unmixed pixels having residual vectors or fitting coefficients that are greater than zero by more than a predetermined threshold, wherein the anomalous pixels may include the identified pixels and various pixels that appear within a predefined window surrounding the identified pixels. A new basis vector set may then be generated for the common pixels to re-reduce the data set for the hyperspectral image, wherein the re-reduced data set for the hyperspectral image may include the basis vector set generated for the common pixels and an unreduced data set for the anomalous pixels in the reduced data set.

Other features of this disclosure and the inventive concept described herein will be apparent to those skilled in the art based on the following drawings and detailed description.

DETAILED DESCRIPTION

Figure 1:
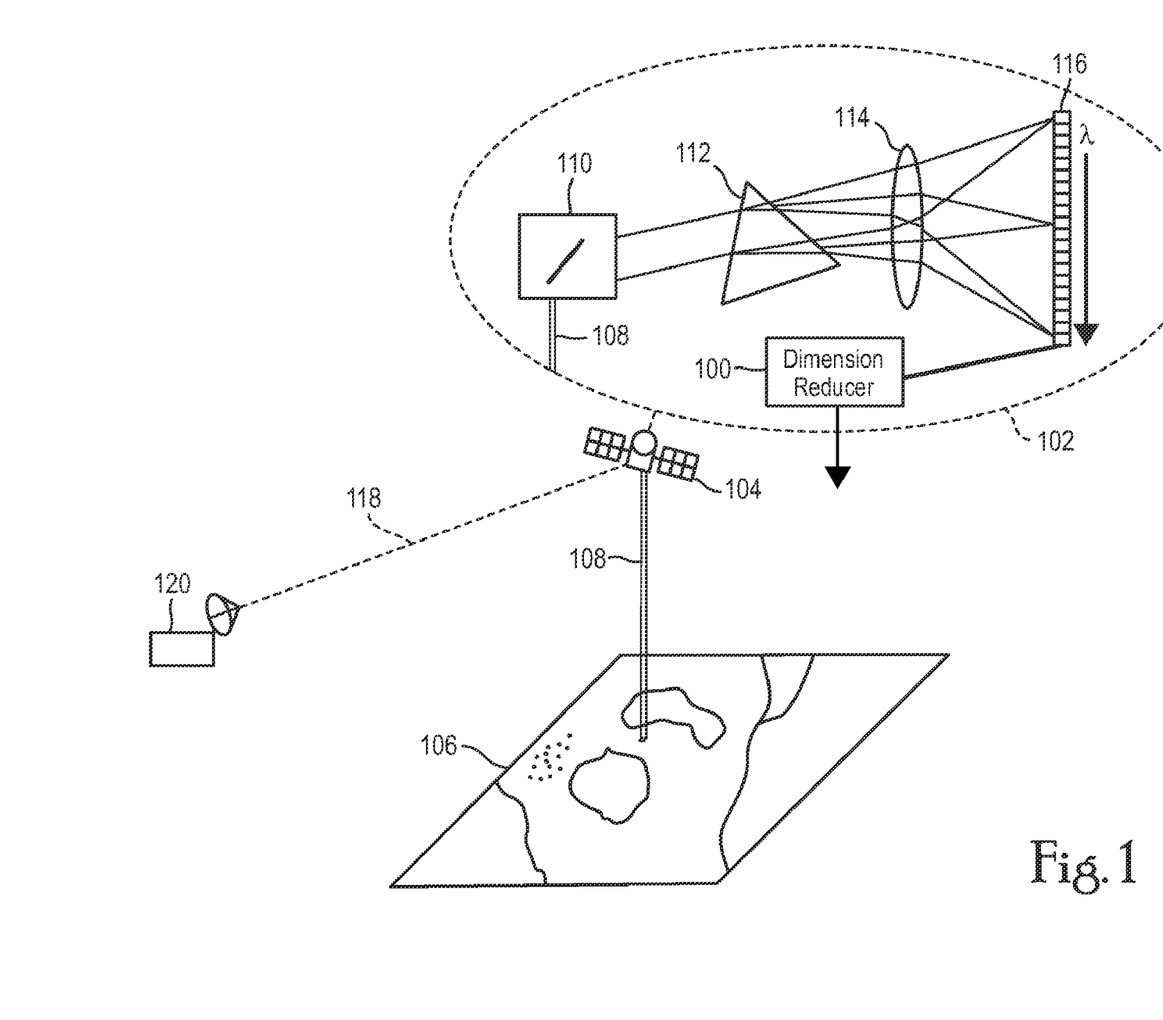
FIG. 1 illustrates an exemplary system for reducing dimensionality of one or more hyperspectral images, according to an embodiment.

According to an embodiment, FIG. 1 illustrates dimensionality reduction system 100, which may generally be used to reduce a dimensionality of one or more hyperspectral images. In particular, hyperspectral imaging system 102 may incorporate dimensionality reduction system 100, wherein hyperspectral imaging system 102 may be coupled to remote imaging system 104 (e.g., a satellite, an aerial surveillance system, or another system that can capture hyperspectral images). In one implementation, remote imaging system 104 may be configured to capture one or more images of a particular scene 106 corresponding to a geographical area.

For example, in one implementation, remote imaging system 104 may be configured to use hyperspectral imaging system 102 to capture a hyperspectral image of scene 106, which may correspond to the geographical area. In particular, hyperspectral imaging system 102 may include one or more scan mirrors 110 or other optics arranged to receive light 108 from one or more ground resolution cells. Scan mirrors 110 or other optics may then direct light 108 through dispersing element 112, which may be arranged to separate light 108 into various different wavelengths. After being separated into the various different wavelengths, light 108 may be provided to one or more imaging optics 114, which may focus the various wavelengths onto array of detectors 116. As such, array of detectors 116 may capture hyperspectral data across the spectrum of wavelengths, thereby generating a data set corresponding to a hyperspectral image of scene 106.

In one implementation, dimensionality reduction system 100 may then process the hyperspectral data associated with the hyperspectral image to reduce the dimensionality of the hyperspectral image. In one implementation, as described in greater detail below, a degree to which the dimensionality of the image is reduced and/or whether the dimensionality reduction is to be classified as lossy or lossless may be an adjustable feature of dimensionality reduction system 100. As such, after the dimensionality of the hyperspectral image has been reduced, a data set corresponding to the reduced hyperspectral image may be processed in various ways. For example, in one implementation, the reduced hyperspectral image may be processed to characterize targets or materials in scene 106, detect changes between various different hyperspectral images captured for scene 106, or perform other analytics on the reduced data set for the hyperspectral image.

In one implementation, dimensionality reduction system 100 may provide a front end interface for an on board processor associated with remote imaging system 104. In such a case, the on board processor may be configured to analyze the reduced data set for the hyperspectral image without requiring the reduced data set to be decompressed or otherwise processed to reconstruct an original (i.e., unreduced) data set for the hyperspectral image. Alternatively (or additionally), dimensionality reduction system 100 may be arranged to compress the hyperspectral image, wherein the reduced data set can be communicated rapidly within transmission 118 to ground station 120 or another location where the data set can be further processed. For example, ground station 120 or other processing locations may analyze the reduced data set for the hyperspectral image without further decompression, after decompressing the reduced data set to produce the original data set, or any appropriate combination thereof.

Figure 2:
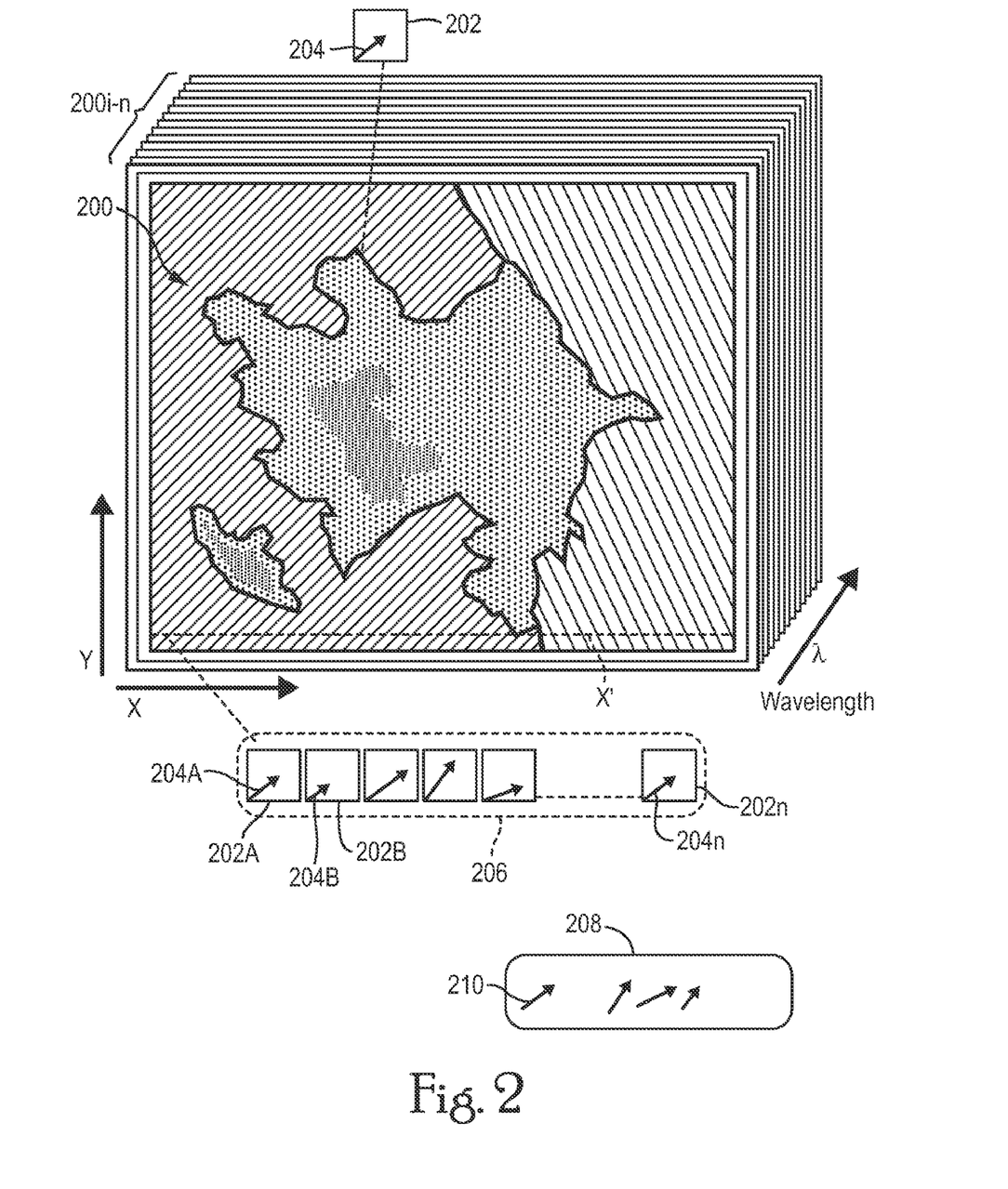
FIG. 2 illustrates an exemplary representation of one or more hyperspectral images, according to an embodiment.

According to an embodiment, FIG. 2 illustrates an exemplary representation of hyperspectral image 200, which may generally include a plurality of images 200$i$-$n$, which may be acquired in a substantially simultaneous manner across various different wavelength ($\lambda$) bands. As shown in FIG. 2, hyperspectral image 200 may include a plurality of pixels 202 arranged according to an x-y coordinate system, although it will be apparent that alternate coordinate systems may be employed in various circumstances. In one implementation, each respective pixel 202 may have spectral vector 204 associated therewith, wherein spectral vector 204 may contain one or more spectral measurements representing energy upwelling from the respective pixel 202. For example, FIG. 2 further illustrates an enlarged section 206 representing a particular row X' of pixels 202$a$-$n$ from one of the plurality of images 200$i$-$n$, wherein each of the various pixels 202$a$-$n$ in the row X' may have a spectral vector 204$a$-$n$ representing the energy upwelling from the respective pixel 202.

In one implementation, hyperspectral image 200 may include basis vector set 208 having one or more basis vectors 210, which may be associated with one or more parameters for controlling error levels, fidelity, or other parameters of individual spectra in hyperspectral image 200 (e.g., a maximum error may be defined for each of pixels 200, wherein basis vector set 208 may have a minimum number of basis vectors 210 derived as a function of the maximum error defined for each respective pixel 200). In one implementation, basis vector set 208 may be derived without a priori knowledge of imaged scene 106, wherein basis vectors 210 may instead be derived to span background materials, statistically sparse targets, or other relevant objects within scene 106 (e.g., the dimensionality reduction system 100 may be configured to derive basis vectors 210 in a manner that represents endmembers for pixel spectra associated with unique objects or other targets in scene 106). Alternatively (or additionally), in certain circumstances, analysts or other users may select one or more pixel spectra to be added to basis vector set 208, or one or more pixel spectra collected and/or measured a priori can be added to basis vector set 208. Basis vectors 210 provided in basis vector 208 may then provide a reduced dimensionality data set for hyperspectral image 200 of scene 106, which can be processed by any known or future developed mechanism for processing hyperspectral data in the form of one or more basis vectors.

Figure 3:
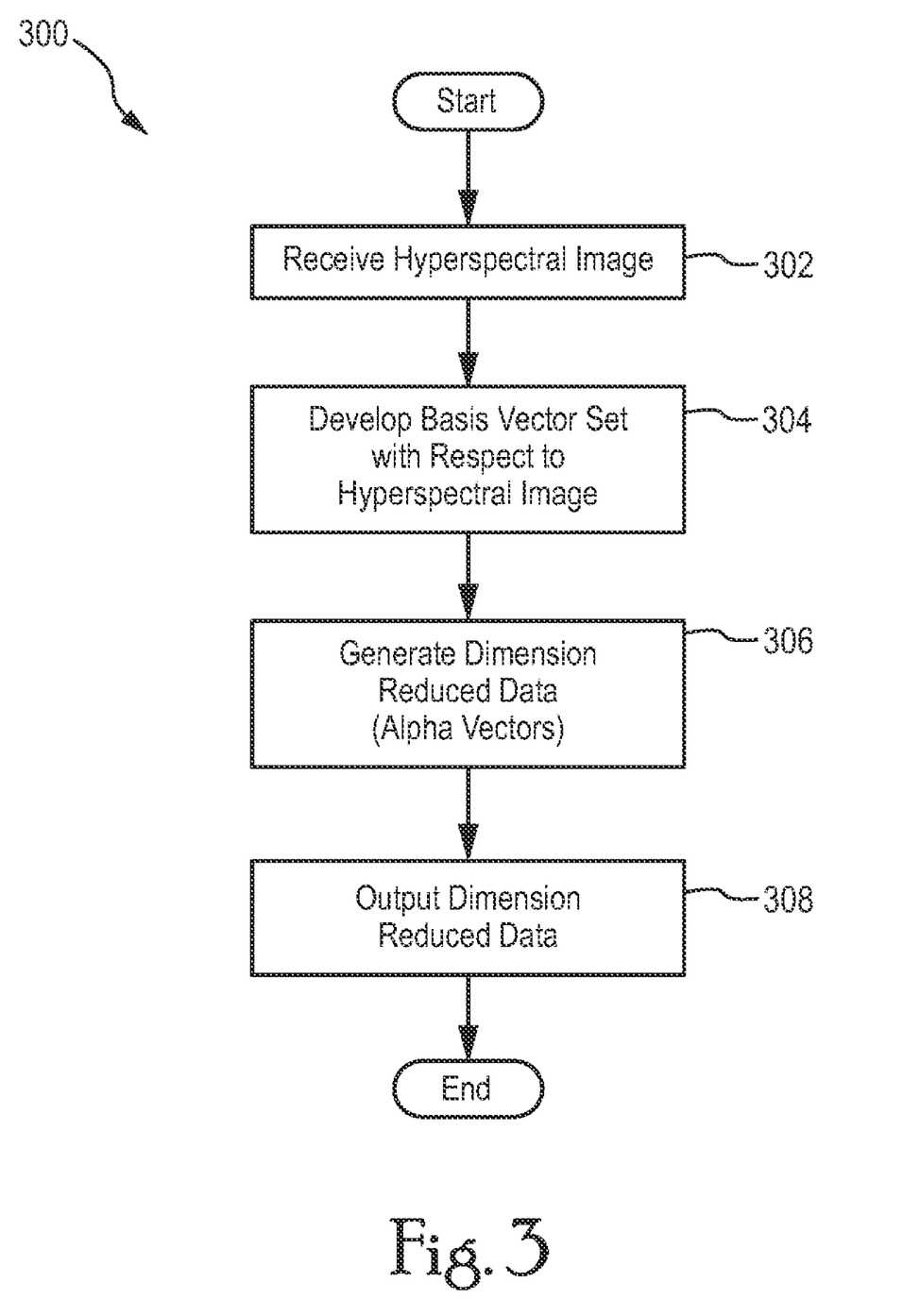
FIG. 3 illustrates an exemplary high level method for reducing dimensionality of one or more hyperspectral images, according to an embodiment.

According to an embodiment, FIG. 3 illustrates an exemplary high level method 300 for reducing dimensionality of one or more hyperspectral images. It will be understood and appreciated that method 300 need not be performed in the particular order illustrated in FIG. 3 and described in further detail herein, but rather may be performed in any suitable order that can result in a reduced dimensionality data set from a data set corresponding to an incoming hyperspectral image. For example, in one implementation, method 300 shown in FIG. 3 may generally include any suitable sequence in which a data set for a hyperspectral image is received (e.g., operation 302) and processed to develop a set of one or more basis vectors for the hyperspectral image (e.g., operation 304). Then, with the basis vector set having been established, operation 306 may include decomposing (e.g., unmixing) each pixel in the hyperspectral image to generate a reduced dimensionality data set (e.g., a plurality of alpha vectors). The alpha vectors generated in operation 306 may then be used to provide an output scene having a reduced dimensionality data set in an operation 308.

Figure 4:
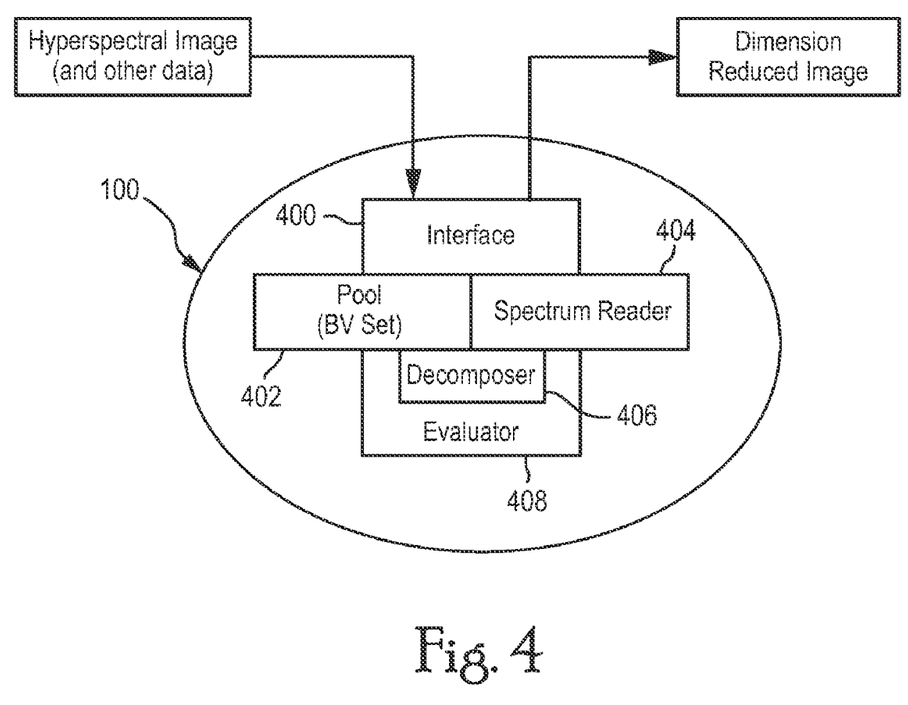
FIG. 4 illustrates an exemplary architecture of a system for reducing dimensionality of one or more hyperspectral images, according to an embodiment.

According to an embodiment, FIG. 4 illustrates an exemplary architecture of system 100 for reducing dimensionality of one or more hyperspectral images. Dimensionality reduction system 100 may be implemented on a computer system, which may generally include typical computer components such as a processor, a memory, one or more storage devices, and one or more input and output devices, among other things. In one implementation, dimensionality reduction system 100 may be maintained in an active memory of the computer system to enhance speed and efficiency, and may further be coupled to a computer network and utilize distributed resources associated with the computer network.

In one implementation, as shown in FIG. 4, dimensionality reduction system 100 may include interface 400, pool (or basis vector set) 402, spectrum reader 404, decomposer 406, and evaluator 408. For example, interface 400 may be configured to receive data corresponding to one or more hyperspectral images, one or more basis vectors provided by a user, an indication as to whether dimensionality reduction is to be performed as a lossy or lossless operation, among other information relating to the processing of hyperspectral images. In one implementation, interface 400 may be arranged to receive information directly from the user via an input device associated with system 100, or directly from a component of system 100 (e.g., array of detectors 116 shown in FIG. 1).

In one implementation, when reducing the dimensionality of a particular hyperspectral image is performed as a lossless operation, it will be understood that a data set resulting from the lossless dimensionality reduction may not necessarily qualify as compressed data because the resulting data set may or may not include additional information causing the reduced data set to be substantially the same or similar in size when compared to the original data set. Nonetheless, the resulting data set may be considered a reduced data set in the sense that other data or processing elements may receive, process, or otherwise utilize a compressed version of the reduced dimensionality data set. Moreover, in one implementation, if reducing the dimensionality of the hyperspectral image is performed as a lossy operation, the resulting data set may provide a compressed lossy version of the hyperspectral image that can be immediately transferred to a ground station or another processing component, wherein additional data associated with the hyperspectral image may be subsequently acquired to produce a lossless version of the hyperspectral image. Thus, providing users with an option to indicate whether dimensionality reduction is to be performed as a lossy or lossless operation may provide these and other possible benefits.

In one implementation, pool 402 may be in communication with interface 400, wherein pool 402 may be arranged to receive a set of one or more basis vectors from interface 400. For example, in one implementation, the basis vector set received at pool 402 may be a default set of basis vectors associated with system 100, a set of basis vectors provided by the user, or various combinations thereof. As such, pool 402 may generally be configured to provide one or more basis vectors to be used when reducing the dimensionality of one or more hyperspectral images.

In one implementation, spectrum reader 404 may be configured to analyze each pixel in a particular hyperspectral image and provide a spectral vector for each respective pixel. Decomposer 406 may be coupled to pool 402 and spectrum reader 404, whereby decomposer 406 may receive the basis vector set from pool 402 and the respective spectral vectors for the various pixels in the hyperspectral image from spectrum reader 404. As such, decomposer 406 may decompose the spectral vector for each of the pixels in the hyperspectral image with the basis vector set (e.g., to characterize materials that make up the various pixels). For example, any given pixel in the hyperspectral image may include a mixture of different materials (e.g., roadways, vegetation, hazardous materials, etc.), wherein decomposer 406 may include an unmixer arranged to determine proportional contributions of a mixed pixel signal to characterize the material making up the particular mixed pixel signal. Thus, decomposer 406 may be configured to employ any suitable unmixing technique to decompose the spectral vectors for the pixels in the hyperspectral image (e.g., principal component analysis, pixel purity indexing, etc.).

In one implementation, evaluator 408 may be coupled to one or more of decomposer 406, pool 402, and spectrum reader 404, wherein evaluator 408 may analyze the decomposed spectral vectors for the pixels in the hyperspectral image. For example, decomposing the spectral vector for a particular pixel may generally result in a residual vector and a fitting coefficient for each entry in the basis vector set. Thus, evaluator 408 may compare a magnitude of the residual vector to a threshold, which may be predefined, input by a user, or defined in other ways. If evaluator 408 determines that the magnitude of the residual vector for the pixel exceeds the threshold, evaluator 408 may then add the spectral vector for the particular pixel to the set of basis vectors in pool 402. Evaluator 408 may therefore analyze the decomposed spectral vectors for each of the pixels in the hyperspectral image to find a complete basis vector set for the hyperspectral image (i.e., either adding a member to the basis vector set or proceeding to a subsequent pixel, depending on the magnitude of the residual vector for each particular pixel).

In one implementation, after evaluator 408 has tested all of the pixels to produce a complete basis vector set, the entire hyperspectral image may then be unmixed with the complete basis vector set to produce a vector having γ fitting coefficients for each x-y coordinate in the scene and a final residual vector having a particular magnitude, wherein γ may represent a number of basis vectors in the complete basis vector set. As such, the γ vectors at each x-y location may form the reduced dimensionality output scene, wherein the pixels at each of the x-y locations in the output scene may have approximately the same information content as the pixels in the original incoming hyperspectral image. In addition, each of the pixels in the reduced dimensionality output scene can be recreated within a specific distance of an original spectrum for the respective pixels, wherein the specific distance may correspond to the threshold value described above.

Figure 5:
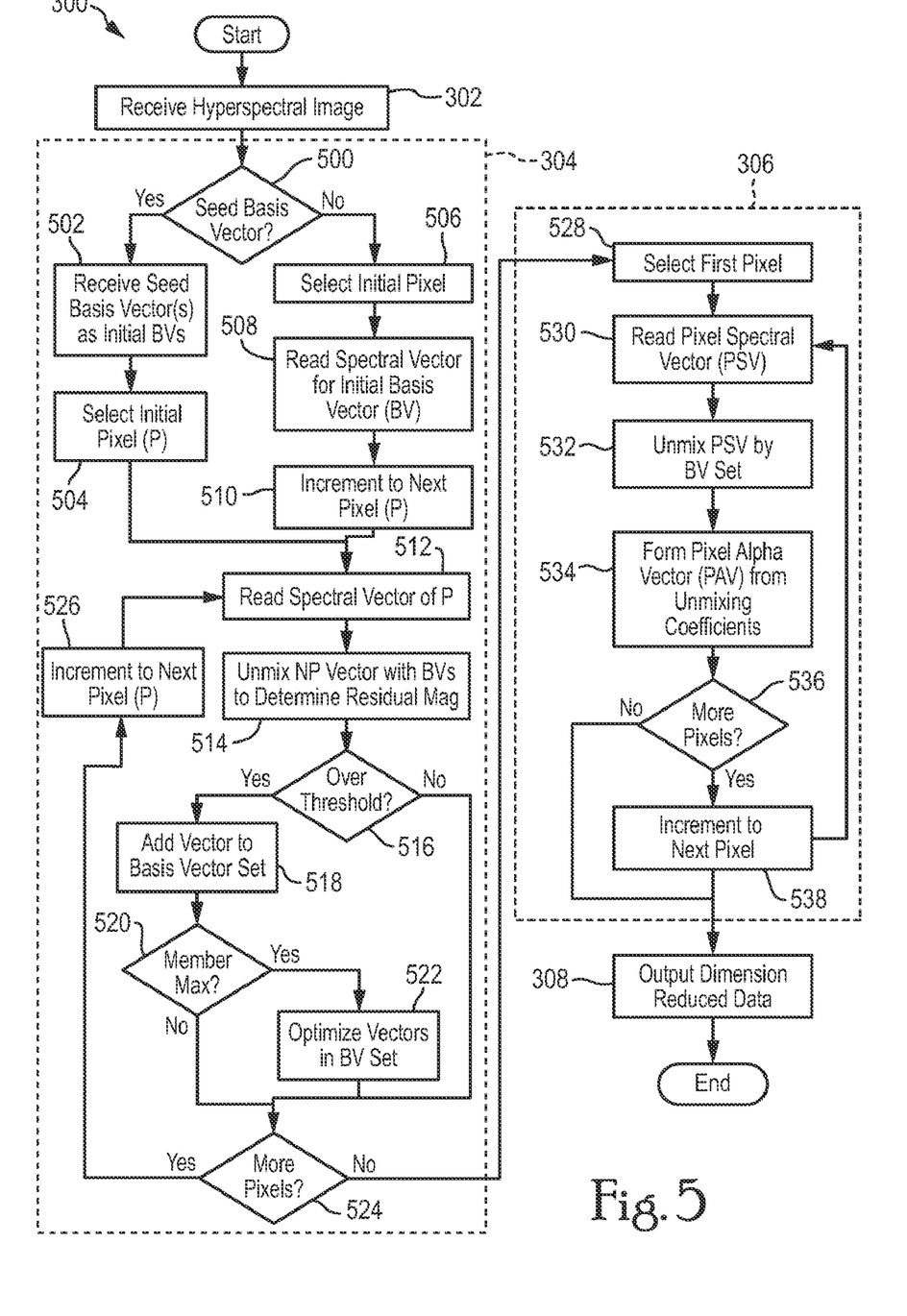
FIG. 5 illustrates an exemplary detailed method for reducing dimensionality of one or more hyperspectral images, according to an embodiment.

According to an embodiment, FIG. 5 illustrates an exemplary detailed method for reducing dimensionality of one or more hyperspectral images. For example, in one implementation, FIG. 5 may provide further detail relating to the method for reducing dimensionality of hyperspectral images illustrated in FIG. 3 and described in farther detail above. More particularly, FIG. 5 illustrates a method for deriving a set of basis vectors from a particular hyperspectral image received in operation 302, wherein the basis vector set may generally provide a collection of various spectral vectors for evaluating spectral vectors associated with all of the pixels within the hyperspectral image.

In one implementation, deriving the basis vector set for the hyperspectral image may commence in operation 500, wherein a determination may be made as to whether one or more seed basis vectors have been provided (e.g., a default set of basis vectors, a set of basis vectors provided by a user, etc.). For example, the seed basis vectors may correspond to spectral vectors of a particular material that expected to exist or not exist within a geographical area from which the hyperspectral image was produced. Thus, if one or more seed basis vectors have been provided, operation 502 may receive the seed vectors as initial basis vectors in the basis vector set. Alternatively, if no seed basis vectors have been provided, the set of basis vectors may be derived entirely from data present within the hyperspectral image itself, wherein operation 506 may include selecting the initial pixel from the hyperspectral image. The spectrum reader may then read a spectral vector for the initial pixel selected in operation 506, wherein the spectral vector for the initial pixel may provide an initial basis vector for the basis vector set in operation 508.

In one implementation, if one or more seed basis vectors have been provided, an initial pixel may then be selected from the hyperspectral image in operation 504 to develop the rest of the basis vector set. For example, the initial pixel selected in operation 504 may be a first pixel in a top left or bottom left corner of the hyperspectral image, wherein the pixels in the hyperspectral image may then be compared in an incremental step pattern across each row or column of the hyperspectral image. However, it will be apparent that the initial pixel may be selected in other ways (e.g., an average of a group of pixels may be selected, a median spectra may be selected, pixels may be selected at random, etc.). Thus, if no seed basis vectors have been provided, operation 510 may increment to select a next pixel in the hyperspectral image after the initial basis vector set has been determined in operation 508. Generally, the pixels may be incremented in an iterative manner from left to right for each row in the hyperspectral image, although it will be apparent that other techniques for incrementing pixels may be suitably employed (e.g., pixels may be randomly incremented, or pixels tending to contain mixtures of materials may be selected, etc.).

In one implementation, a spectral vector for the pixel selected in operation 504 and/or 510 may then be read in operation 512. The spectral vector of the selected pixel may then be decomposed with the current members of the basis vector set in operation 514. For example, in one implementation, decomposing the spectral vector of the selected pixel in operation. 514 may include unmixing the spectral vector with the current members of the basis vector set. In particular, unmixing will generally be understood and appreciated as referring to various techniques for decomposing spectral vectors into one or more component parts. For example, the spectral vector for a particular pixel may include spectral elements representing grass, aluminum, and sand, whereby the spectral vector may include a composite of spectral elements for the various materials making up the particular pixel. Thus, a spectral vector for grass will be revealed when the composite spectral vector is unmixed with basis vectors representative of aluminum and sand (and similarly, a spectral vector for aluminum results when the composite spectral vector is unmixed with basis vectors representative of grass and sand, and a spectral vector for sand results when the composite spectral vector is unmixed with basis vectors representative of grass and aluminum).

As such, in one implementation, the spectral vector for the current pixel may be unmixed in operation 514 to determine a fitting coefficient for the decomposed spectral vector with respect to each of the current members of the basis vector set, and to further determine a residual vector that has a particular magnitude. For example, the unmixed spectral vector for the current pixel may represent an algebraic combination of the current members of the basis vector set, which may be weighted according to the fitting coefficients and the magnitude of the residual vector. Thus, operation 514 may further determine the magnitude of the residual vector, which may include determining a square root of a dot product for the residual vector with itself, otherwise known as a Euclidean distance, provided by the equation:

$$\|x\| := \sqrt{x_1^2 + \ldots + x_n^2}.$$

where $x = [x_1, x_2, \ldots, x_n]$.

In one implementation, the magnitude of the residual vector, as determined in operation 514, may then be compared to a threshold value in operation 516. For example, the threshold value may be provided by a user, or the threshold value may be predetermined (e.g., based on a desired reduction ratio or error metric). If the magnitude of the residual vector exceeds the threshold value, operation 518 may include adding the residual vector for the current pixel to the current members of the basis vector set.

Additionally, in one implementation, the basis vector set may be associated with a maximum number of members, wherein operation 520 may determine whether adding the residual vector for the current pixel would result in the basis vector set exceeding the maximum number of members. If adding the residual vector for the current pixel would not cause the number of members in the basis vector to exceed the maximum, the residual vector for the current pixel may be added to the basis vector set. However, if adding the residual vector for the current pixel would cause the number of members in the basis vector to exceed the maximum, the members of the basis vector set may be optimized in operation 522 (e.g., to select the basis vectors having the largest magnitudes, spanning the largest range, most closely approximating a spectral mean or median, etc.).

For example, in one implementation, operation 522 may include determining whether the magnitude of the residual vector for the current pixel exceeds the magnitude of at least one of the residual vectors previously computed for pixels added to the basis vector set. If so, the residual vector for the current pixel may replace a member of the basis vector set having a smallest residual magnitude, otherwise the residual vector for the current pixel may not be added to the basis vector set. Additionally, if seed basis vectors were received in operation 502, the seed basis vectors may generally be maintained as core members of the basis vector set (i.e., the residual vector for the current pixel can replace members associated with other pixels previously added to the basis vector set, but cannot displace the seed basis vectors). Further, in one implementation, the seed basis vectors may or may not count towards the maximum number members in the basis vector set, but in either case the seed basis vectors cannot be replaced by the residual vector for the current pixel. In other words, the seed basis vectors may provide important information to be used when analyzing the hyperspectral image, such that the seed vectors are preserved within the basis vector set.

In one implementation, after the current pixel has been processed as described above, operation 524 may include determining whether the hyperspectral image includes more pixels that remain to be processed. If more pixels remain to be processed, operation 526 may increment to the next pixel and the next pixel may then be processed in a similar manner, beginning in operation 512. Additionally, although pixels are generally incremented in an orderly fashion, the specific manner for incrementing pixels may include any suitable technique (e.g., from left to right, from right to left, from top to bottom, from bottom to top, randomly, etc.). As such, regardless of the specific manner used to increment pixels in operation 526, the iterative derivation of the complete set of basis vectors in operations 512-522 may eventually evaluate all of the pixels in the hyperspectral image to determine an appropriate set of basis vectors for the entire hyperspectral image.

In one implementation, when all of the pixels in the hyperspectral image have been tested, the basis vector set may be complete and the basis vector set may be analyzed to produce a reduced dimensionality output scene corresponding to the hyperspectral image that was received in operation 302. In particular, the complete set of basis vectors may be analyzed in operation 306 to derive alpha vectors for each x-y location in the hyperspectral image. For example, the alpha vectors may be derived in a similar manner as described above for deriving the complete set of basis vectors, wherein an initial pixel may be selected in operation 528, and a spectral vector for the initial pixel may then be read in operation 530. The spectral vector may then be decomposed with the complete set of basis vectors in operation 532, wherein decomposing the spectral vector may include unmixing, as discussed in further detail above.

As such, in one implementation, decomposing the spectral vector for the current pixel may result in a final residual vector and a fitting coefficient with respect to each member of the basis vector set. The final residual vector and the fitting coefficients for the entire basis vector set may then be used in operation 534 to form an alpha vector for an x-y location corresponding to the current pixel. All of the pixels in the scene may then be similarly unmixed with the complete set of basis vectors, wherein operations 536 and 538 may iteratively increment to subsequent pixels in the scene until every pixel in the scene has been unmixed with the complete basis vector set to produce an alpha vector for a corresponding x-y location. Thus, after all of the pixels in the scene have been unmixed with the complete set of basis vectors, a reduced dimensionality output scene corresponding to the hyperspectral image may be generated in operation 308 (e.g., a three dimensional data set, represented as a reduced dimensionality hypercube).

For example, in one implementation, the reduced dimensionality output scene may be represented as a vector having $\gamma$ fitting coefficients and a final residual magnitude for each x-y location in the scene, wherein $\gamma$ corresponds to the number of members in the complete basis vector set. Thus, the $\gamma$ vectors at each x-y location may form the reduced dimensionality output scene, wherein each pixel in the output scene may have approximately the same information content as the corresponding pixel in the original input scene, and wherein each pixel in the output scene can be recreated within a threshold distance of the original pixel spectrum (i.e., the threshold distance corresponds to the threshold value used in operation 516). Thus, the $\gamma$ vectors at a particular x-y location in the output scene may substantially represent composite spectral frequencies present in that location, which may be critical when processing the hyperspectral image to detect anomalies or subtle changes to the scene (e.g., an arrival or departure of small targets).

Additionally, the value of $\gamma$ may be used to determine a relative ratio of compression or reduction achieved for the input scene received in operation 302. In particular, the input scene received in operation 302 may generally include a three dimensional data set having $\lambda$ spectral entries that represent radiance or reflectance spectra for each x-y location, while the output scene generated in operation 308 may be a smaller three dimensional data set having $\gamma$ entries for each x-y location. As such, the ratio of $\lambda$ to $\gamma$ may provide the relevant compression or reduction ratio (e.g., if a twenty member basis vector set is derived from a hyperspectral image that originally included one hundred spectral bands, the data set for the hyperspectral image would be compressed or reduced by a factor of five). Thus, the reduced data set may generally be provided in a similar format as an uncompressed or otherwise unreduced hyperspectral image, whereby the reduced data set can be processed using any known or subsequently developed technique for analyzing hyperspectral images without requiring reconstruction of the original image.

Figure 6:
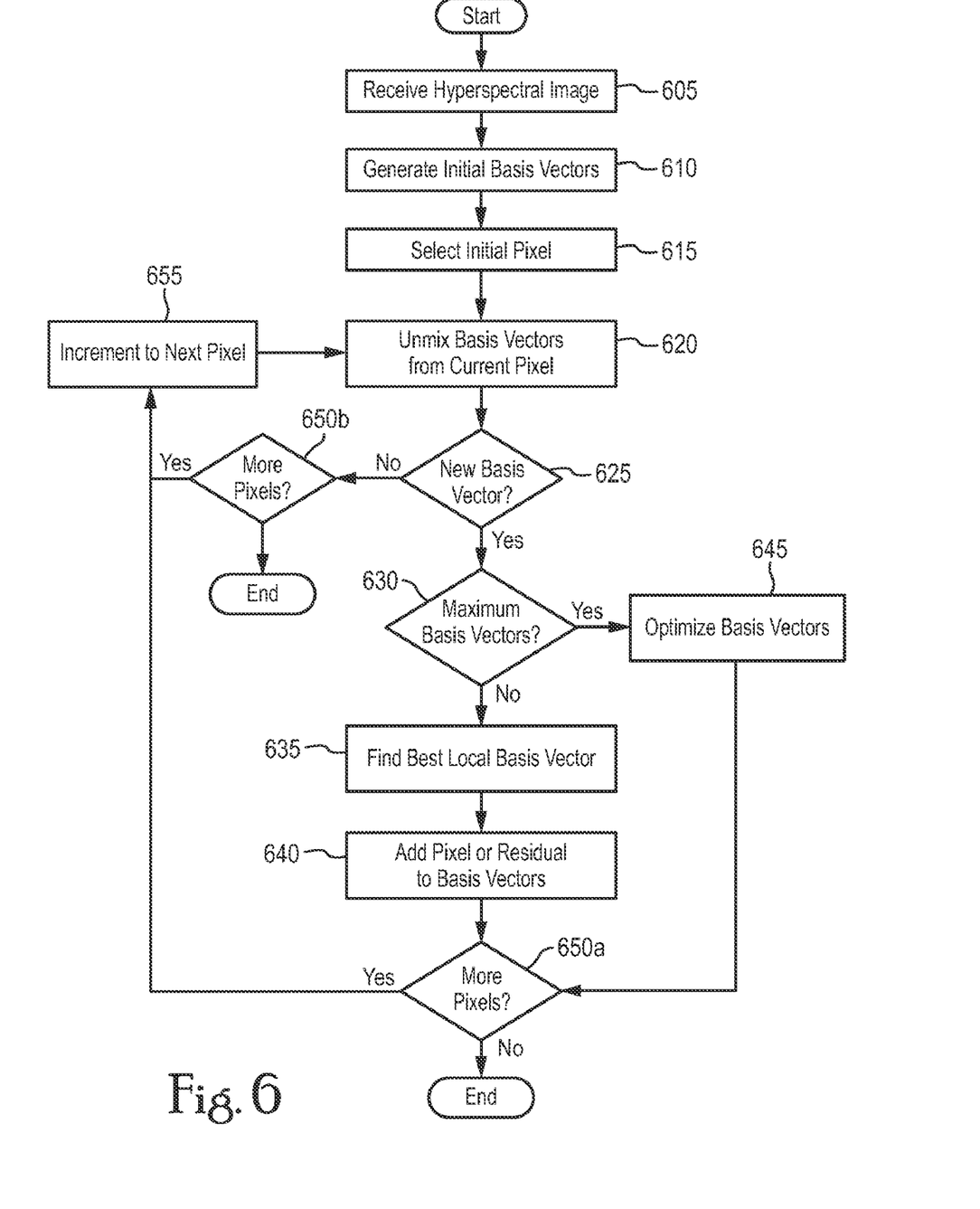
FIG. 6 illustrates an exemplary optimized method for reducing dimensionality of one or more hyperspectral images, according to an embodiment.

According to an embodiment, FIG. 6 illustrates an exemplary optimized method for reducing dimensionality of one or more hyperspectral images. For example, the dimensionality reduction methods described above may be effective for generating reduced dimensionality output scenes that preserve information content from input scenes captured in hyperspectral images (i.e., by deriving basis vectors from hyperspectral images that identify unique aspects of the scene). In certain instances, however, imaging systems used to capture hyperspectral images may introduce sensor calibration artifacts or other anomalies, which may compromise the reduction ratio or result in non-optimal basis vectors being created, especially when a particular scene includes many small targets or unique regions.

For example, when the dimensionality reduction methods described above employ a maximum number of basis vectors, a current pixel only results in a new basis vector being added to the basis vector set if the new basis vector has a magnitude exceeding the magnitude of a basis vector for at least one pixel previously added to the basis vector set. Consequently, the approach described above may result in the basis vector set tending to retain basis vectors for the first several pixels that are tested, wherein the first several basis vectors tend to not be replaced even if subsequent pixels may provide better basis vectors. In addition, the approach described above may further lead to pixels associated with boundary regions being selected as new members of the basis vector set, even though these pixels may not necessarily be the most representative or otherwise relevant pixels within the scene. Thus, the approach described above may result in the basis vector set including more members than are necessary to characterize unique or anomalous aspects of a scene, which may also adversely impact the reduction or compression ratio provided by the reduced data set.

Thus, in one implementation, the method illustrated in FIG. 6 and described herein may provide an optimized method for reducing dimensionality of hyperspectral images, which may be more robust in situations where a hyperspectral image includes sensor induced artifacts or particularly unique characteristics. More particularly, the optimized method for reducing dimensionality of hyperspectral images may commence upon receiving a hyperspectral image in operation 605, which may generally include a three dimensional data set having λ spectral entries representative of radiance or reflectance spectra for each x-y location in the scene. A set of γ basis vectors may then be derived from the three dimensional data set to produce a reduced data set that preserves sufficient information for detecting all relevant targets in a scene corresponding to the hyperspectral image received in operation 605.

In one implementation, prior to deriving the set of basis vectors, the hyperspectral image may be subject to one or more pre-processing steps designed to enable more accurate unmixing and/or to provide one or more sets of pixels with a reduced variety of background types. For example, in one implementation, the pre-processing steps may include spectral variance normalization, magnitude normalization, covariance normalization (i.e., whitening), segmentation, or other appropriate steps that improve unmixing accuracy or otherwise provide sets of pixels with similar or related characteristics. Additionally (or alternatively), pre-processing the hyperspectral image may include converting data associated with the scene from sensor radiance to ground leaving radiance or reflectance (e.g., data having values that depend on temperature may be input as sensor radiance, ground leaving radiance, reflectivity, or vectors of reflectivity, with a temperature estimate being appended to the data).

In one implementation, an initial set of basis vectors may then be generated in operation 610, wherein the initial set of basis vectors may include a predetermined number of basis vectors derived from randomly selected aspects of the scene (e.g., the predetermined number of initial basis vectors may be derived from spectral properties for pixels that are randomly chosen from the scene, from an average of spectral properties for groups of pixels that are randomly chosen from the scene, etc.). Additionally, the initial basis vectors generated in operation 610 may be scored with a residual vector magnitude of zero or small random numbers, which may provide a near guarantee that the initial basis vectors will be replaced when the pixels associated with the scene are subsequently processed. In particular, as will be described in greater detail below, each pixel in the scene may then be individually processed, including any pixels that may be associated with the initial set of basis vectors. As such, if the subsequent processing of individual pixels in the scene results in one or more of the initial basis vectors being replaced, the replaced basis vectors may potentially be added back to the set of basis vectors when the pixels associated with the replaced vectors are individually processed.

In one implementation, after the initial set of basis vectors have been generated, operation 615 may include selecting an initial one of the pixels in the hyperspectral image to optimize the initial basis vector set (e.g., the pixel may be selected incrementally from left to right, top to bottom, at random, or in other ways). As such, the set of basis vectors may be continually optimized in an iterative manner based on the processing of each individual pixel in the scene. In particular, after the current pixel has been selected in operation 615 (or after incrementing to the current pixel in operation 655), operation 620 may include unmixing the current set of basis vectors from the spectral properties of the current pixel. In one implementation, unmixing the current set of basis vectors from the current pixel may result in a residual vector for the current pixel, in addition to γ fitting coefficients with respect to each current member of the basis vector set (where γ equals the number of members in the basis vector set). In one implementation, unmixing operation 620 may be performed using unconstrained linear unmixing, although other variants of linear and/or non-linear unmixing can be suitably employed.

In one implementation, operation 625 may then determine whether the current pixel should be added to the current set of basis vectors. For example, in one implementation, if the residual vector for the current pixel has a magnitude exceeding a predetermined threshold and/or a smallest residual vector magnitude among the current members of the basis vector set, operation 625 may determine that a new basis vector for the current pixel is to be added to the current members of the basis vector set. Alternatively (or additionally), if the γ fitting coefficients for the current pixel are larger than unity, the current pixel likely includes fewer material variations, such that operation 625 may determine that a new basis vector for the current pixel is to be added to the current members of the basis vector set. However, if none of these conditions are satisfied, operation 625 may determine not to add the current pixel to the current members of the basis vector set. Whether any more pixels remain to be processed may then be determined in operation 650b, whereby operation 655 may increment to the next pixel if further pixels remain to be processed, otherwise the method may end if no further pixels remain to be processed.

In response to determining that the current pixel is to be added to the current members of the basis vector set, operation 630 may determine whether a maximum number of members has been established for the basis vector set. For example, in one implementation, the number of members in the basis vector set may be limited to a predetermined maximum, wherein the predetermined maximum may correspond to the number of members in the initial basis vector set. If the basis vector set has been limited to the predetermined maximum, the members of the basis vector set may then be optimized in operation 645.

For example, in one implementation, the current pixel and each of the current members of the basis vector set may be considered candidate vectors for the optimized set of basis vectors, whereby the number of candidate vectors may be one more than the predetermined maximum (i.e., the current basis vector set is pre-populated with the maximum number of members in the manner described above, such that the current pixel causes the number of candidate vectors to be one more than the maximum). As such, to determine the members of the optimized basis vector set, operation 645 may include decomposing each of the candidate vectors using an eigen transformation to determine a direction having a minimum power variance. The candidate vectors may then be rotated away from the determined direction to identify the candidate vectors spanning a subspace that contains the most power. In other words, the candidate vector that is closest to the direction with the least power may be eliminated from the optimized set of basis vectors, resulting in the rotated vectors retaining a maximum amount of information content (e.g., the optimized set of basis vectors may be selected to ignore or otherwise eliminate spectral bands that are within or very close to strong atmospheric absorption bands).

Alternatively, in one implementation, operation 645 may employ a "leave one out" technique to optimize the members of the basis vector set. In particular, a candidate basis vector set having the maximum number of members may be constructed from the current pixel and the current members of the basis vector set (i.e., one of the current members of the basis vector set is intentionally left out of the candidate basis vector set). Additional candidate basis vectors may be similarly constructed in an iterative manner, with a different one of the current members of the basis vector set being left out of each respective candidate basis vector set. As such, the number of candidate basis vector sets that are constructed may equal one more than the maximum number of members for the optimized basis vector set. The residual vector magnitude may then be computed for each of the basis vectors that are left out, wherein the current pixel may replace the basis vector with the smallest residual vector magnitude.

For example, in one implementation, an M×M inverse of a correlation matrix may be computed for a particular one of the candidate basis vector sets, with M equaling the maximum number of members for the optimized basis vector set. The inverse of the correlation matrix may therefore be used to compute the residual vector magnitude for the basis vector left out of the particular candidate basis vector set. Additionally, to compute the residual vector magnitude for the basis vector left out of subsequent iterations, the inverse of the correlation matrix for the previous candidate basis vector set may be retained (i.e., the only vectors to change in each iteration are the vectors left out of the previous iteration and the current iteration, such that retaining the inverse of the correlation matrix for the previous iteration may significantly reduce computational overhead).

Alternatively, if operation 630 determines that the maximum number of members for the basis vector set has not been established, the number of members for the basis vector set may generally remain unconstrained during processing of individual pixels in the scene. As such, after each pixel in the scene has been processed, a subset of the unconstrained basis vector set may be selected to constitute the final members of the basis vector set, wherein the number of final members selected for the basis vector set may equal the number of members in the initial basis vector set.

For example, in one implementation, if operation 625 determines that the current pixel is to be added to the members of the basis vector set and operation 630 determines that the maximum number of members for the basis vector set has not been established, operation 635 may search locally to find a best basis vector to be added to the members of the unconstrained basis vector set. For example, the method described above in connection with FIG. 5 may generally add pixels that tend to contain mixtures of materials to the set of basis vectors, wherein the mixtures of materials may either be naturally occurring or a result of optical blurs or other artifacts of the sensor. Thus, because a small number of pixels that each contain unique information would be ideal candidates to be added to the set of basis vectors, operation 635 may compute residual vector magnitudes for each pixel in a window around the current pixel. A particular pixel within the window that has a largest residual vector magnitude may then be selected and added to the set of basis vectors in operation 640.

In one implementation, after the current pixel has been added to the current members of the basis set vector set as described above in operations 630-645, operation 650a may determine whether any more pixels remain to be processed. In particular, if further pixels remain to be processed, operation 655 may increment to the next pixel, otherwise the method may end if no further pixels remain to be processed. Alternatively, if the number of members for the basis vector set was left unconstrained during the processing of individual pixels, the maximum number of basis vectors may be selected from the unconstrained basis vector set in an additional optimization operation (not shown), which may include various techniques for selecting the final members of the basis vector set.

For example, in one implementation, the additional optimization operation may include decomposing each member of the unconstrained basis vector set to determine a direction having a minimum power variance in a similar as described above for operation 645. The members of the unconstrained basis vector set may then be rotated away from the determined direction to find M vectors that span a subspace containing the most power (where M equals the maximum number of members). As such, the rotated vectors that are selected for the final members of the basis vector set may retain a maximum amount of information content (i.e., projecting away from the direction with the smallest power results in the M vectors selected for the final members being able to span a largest space of pixels in the scene).

Alternatively, in one implementation, the additional optimization operation may examine a root sum square (RSS) of the $\gamma$ fitting coefficients for each pixel that is a member of the unconstrained basis vector set, wherein the M pixels with the largest root sum squares may be selected for the final members of the basis vector set. Another optimization technique may include, on a per pixel basis, eliminating the members that have the smallest magnitude of $\gamma$ fitting coefficients until the best M basis vectors remain. A code word or other information may then be appended to each pixel denoting the members of the unconstrained basis vector set that have been retained or eliminated, which may substantially reduce errors on a per pixel basis. Each of the members eliminated from the final basis vector set may then be replaced with a zero or a small random number to enable testing of the scene for anomalies, targets, or changes from a prior version of the scene.

Figure 7:
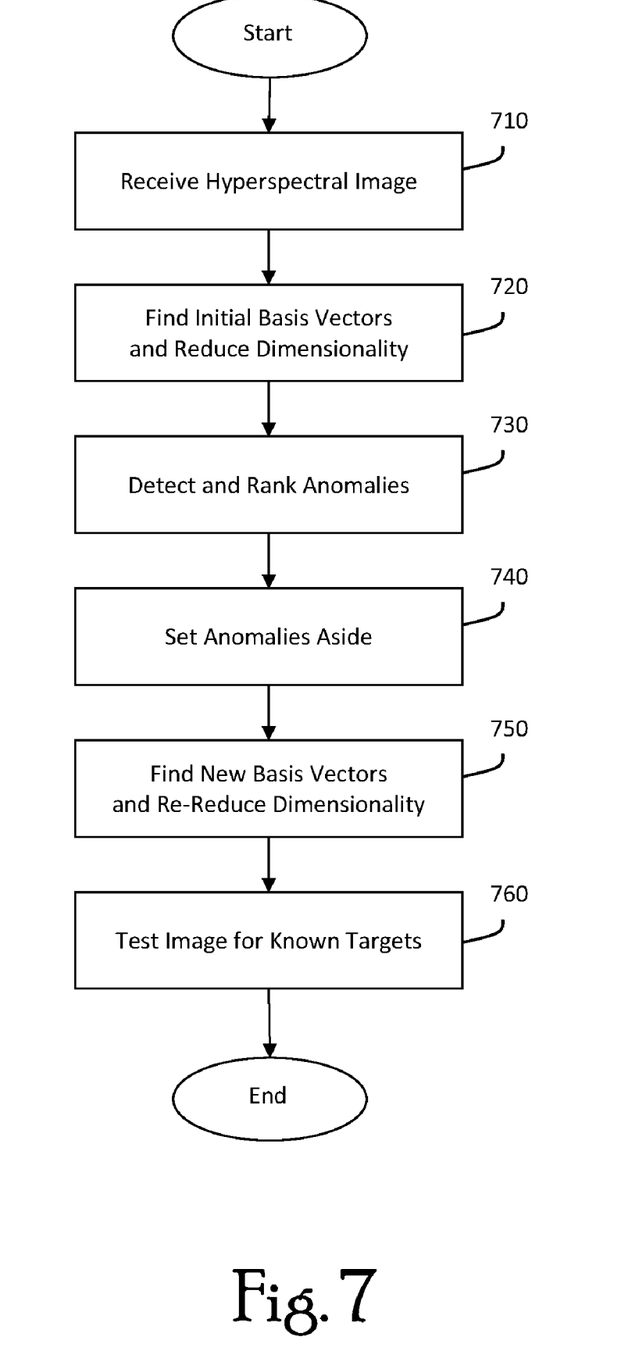
FIG. 7 illustrates an exemplary method for reducing dimensionality of one or more hyperspectral images in multiple passes based on one or more anomalies present in the hyperspectral images, according to an embodiment.

According to an embodiment, FIG. 7 illustrates an exemplary method for reducing dimensionality of one or more hyperspectral images in multiple passes based on one or more anomalies that may be present in the hyperspectral images. In general, the method illustrated in FIG. 7 and described herein may commence in operation 710, wherein a hyperspectral image data set corresponding to a particular scene may be received. For example, in one implementation, the hyperspectral image data set received in operation 710 may generally include a three dimensional data set having $\lambda$ spectral entries representative of radiance or reflectance spectra for each x-y location in the scene, as described in further detail above. In one implementation, operation 720 may then include performing a first pass for reducing the dimensionality of the hyperspectral image, wherein the first dimensionality reduction pass may be performed using the method illustrated in FIG. 6 and described in further detail above. As such, operation 720 may derive an initial set of $\gamma$ basis vectors from the three dimensional data set for the hyperspectral image received in operation 710, wherein the first dimensionality reduction pass may produce a reduced data set for the hyperspectral image that preserves sufficient information for detecting relevant targets in the scene corresponding to the hyperspectral image. In one implementation, when reducing the dimensionality of the hyperspectral image in multiple passes, as illustrated in FIG. 7, the first dimensionality reduction pass may be performed with an unconstrained number of basis vectors (i.e., operation 630 may always determine that the maximum number of basis vectors has not been reached).

In one implementation, the first pass of the reduced dimensionality data set, as produced in operation 720, may then be further reduced in a second dimensionality reduction pass based on any anomalies that may be present in the scene. For example, operation 730 may include treating the reduced dimensionality data set produced in operation 720 as bimodal, wherein the data may be segregated into common and anomalous pixels, as described in further detail below.

In one implementation, in response to the dimensionality of the hyperspectral image being reduced in the first pass in operation 720, operation 730 may generally include detecting and ranking any anomalies that may be present in the reduced data set, wherein the anomalies may cause the first pass of the reduced dimensionality set to create the initial basis vector set with more basis vectors that desired (e.g., because the basis vectors were assigned to pixels that were atypical of the scene, generally corresponding to targets or sensor artifacts). Thus, in one implementation, operation 730 may include unmixing each pixel in the reduced dimensionality data set with the initial basis vectors derived for the reduced dimensionality data set to derive a residual vector and a fitting coefficient with respect to each of the basis vectors in the initial basis vector set. As such, operation 730 may identify any pixels in the reduced dimensionality data set that may qualify as anomalies and rank such potentially anomalous pixels according to the magnitudes of the residual vectors and/or the fitting coefficients for the potentially anomalous pixels. Based on the magnitude of the residual vectors and/or the fitting coefficients for the pixels that are ranked in operation 730, a predetermined percentage or ratio of the pixels that are more than a particular threshold from zero may then be termed "anomalies." Alternatively, every pixel that varies from zero by more than the threshold may be termed an anomaly.

In one implementation, operation 740 may then include setting aside the anomalous pixels and characterizing the remaining (non-anomalous) pixels in the scene as "common." In one implementation, in addition to the anomalous pixels, operation 740 may further include setting aside any pixels that appear in a predetermined neighborhood of the anomalous pixels. For example, the neighborhood of the anomalous pixels may be defined to include any pixels within a particular window surrounding the anomalous pixels (e.g., the window may include the eight pixels immediately adjacent to any particular anomalous pixel, although the window may vary in size depending on the particular application). As such, setting aside the anomalous pixels and any pixels in the neighborhood of the anomalous pixels may result in the first pass of the reduced dimensionality data set having only the common pixels, which may then be subject to a second dimensionality reduction pass in operation 750 (e.g., according to the method illustrated in FIG. 6 and described in further detail above). In one implementation, the second dimensionality reduction pass in operation 750 may or may not include a maximum number of members for the new basis vector set. However, if a particular compression ratio is required for the reduced data set to be produced in the second pass, a maximum number of members may be defined for the new basis vector set to be derived in operation 750 in order to guarantee the relevant compression ratio.

As such, the number of basis vectors in the reduced data set produced in the second pass (i.e., operation 750) may have a substantially reduced number of members after the anomalous pixels in the scene have been set aside (i.e., as compared to the initial set of basis vectors). Furthermore, the reduced data set produced in the second pass may suitably span a complex scene even with the substantially reduced number of basis vectors. In particular, the anomalous pixels in the scene may generally correspond to the most unique or unusual aspects of the scene, whereby removing the anomalies may preserve those aspects of the scene that are most likely to be relevant to detecting targets in the scene or detecting changes from prior versions of the scene. In addition, reducing the dimensionality of the hyperspectral image in multiple passes with the anomalous pixels set aside in the second pass may provide a larger compression or reduction ratio for the final reduced data set because the second pass dimensionality reduction pass is only applied to the most typical or otherwise common aspects of the scene. Thus, preserving the full dimensionality of the anomalous pixels and the pixels in the neighborhood of the anomalous pixels may provide the maximum information content that may be relevant to analyzing the reduced data set for the scene. In addition, in one implementation, the reduced data set produced for the common pixels in operation 750 may be analyzed to detect whether any further anomalies are present in the reduced data set produced in the second pass, wherein the reduced data set produced for the common pixels may be processed in a similar manner as described above with reference to operations 730 through 750.

In one implementation, the final output produced in operation 750 may then be tested for one or more known targets in operation 760. In particular, the final output produced in operation 750 may generally include a reduced data set for the common pixels in the hyperspectral image and an unreduced data set for the anomalous pixels (i.e., if the final reduced data set is to be tested for known targets, the anomalous pixels may remain unreduced to ensure that the maximum information content is preserved for analysis, while the anomalous pixels could be further reduced if the particular application simply required capturing and storing a suitable data set for the scene). In one implementation, testing the hyperspectral image for known targets in operation 760 may testing the unreduced data set for the anomalous pixels for known targets, and may further include testing the reduced data set produced in multiple passes for the common pixels for known targets. Thus, operation 760 may include testing the unreduced data set and/or the multiple pass reduced data set with known spectra for corresponding to the known targets. For example, as noted above, certain materials or targets may be known to have particular spectral characteristics, which may provide known signal waveforms that may be used to detect such known materials or targets within a particular pixel.

Figure 8:
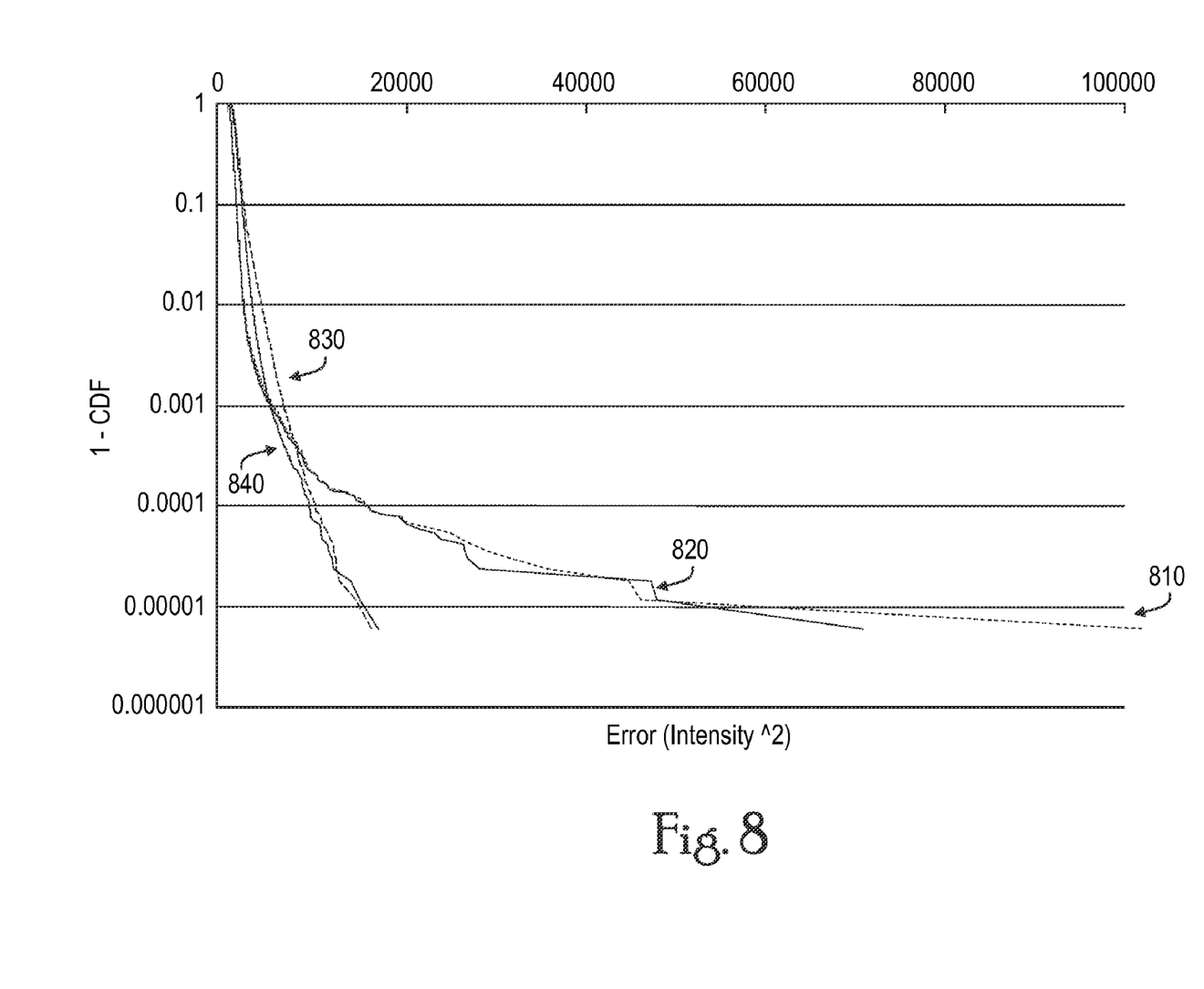
FIG. 8 illustrates a graph representing comparative pixel level errors associated with various different techniques for reducing the dimensionality of hyperspectral images, according to an embodiment.

According to an embodiment, FIG. 8 illustrates a graph representing comparative frequencies of pixel level errors associated with various different techniques for reducing the dimensionality of hyperspectral images. In particular, the graph illustrated in FIG. 8 generally illustrates the pixel level error along the x-axis in a particular scenario where the various dimensionality reduction techniques were used to reduce the same hyperspectral image data set according to a reduction factor of fourteen. As shown in FIG. 8, the plot corresponding to element 810 corresponds to the principal component analysis (PCA) dimensionality reduction method, element 820 corresponds to the dimensionality reduction method described in U.S. patent application Ser. No. 11/856,588, which is incorporated by reference above, element 830 corresponds to the optimized dimensionality reduction method illustrated in FIG. 6 and described above, and element 840 corresponds to a different instantiation of the optimized method for generating basis vector sets illustrated in FIG. 6. The curves illustrated in FIG. 8 show minor losses of energy and/or information in the last fraction of a percent of the data, while there are no errors in the last fraction of data processed using the multiple pass dimensionality reduction method illustrated in FIG. 7 and described above. Thus, as shown in FIG. 8, reducing the data set of a hyperspectral image according to the techniques illustrated in FIG. 6 and FIG. 7, as described above, may provide substantial reductions in the pixel level error in the reduced data sets produced thereby.

These "rare" (e.g., last fraction of a percent) pixels are generally the pixels most likely to contain targets of interest.

According to an embodiment, implementations of the various systems and methods for reducing dimensionality of hyperspectral images described herein may be made in hardware, firmware, software, or various combinations thereof. For example, the systems and methods for reducing dimensionality of hyperspectral images be implemented as computer executable instructions stored on a machine readable medium, which may be read and executed using one or more physically separate or communicatively coupled computer systems or other processing devices. The machine readable medium may include various mechanisms for storing and/or transmitting information in a manner readable by the computer systems, the processing devices, or other machines. For example, a machine readable storage medium may include read only memory, random access memory, magnetic disk storage media, optical storage media, flash memory devices, hard drives, and other media for storing information, and a machine readable transmission media may include signals such as carrier waves, infrared signals, digital signals, and other media for transmitting information. Additionally, although the above disclosure may describe methods, firmware, software, routines, or instructions in terms of specific exemplary aspects and implementations and performing certain actions, it will be apparent that such descriptions are merely for the sake of convenience and that such actions in fact result from the computer systems, the processing devices, processors, controllers, or other devices or machines executing the firmware, software, routines, or instructions.

Furthermore, aspects and implementations may be described in the above disclosure as including particular features, structures, or characteristics, but it will be apparent that every aspect or implementation may or may not necessarily include the particular features, structures, or characteristics. Further, where particular features, structures, or characteristics have been described in connection with a specific aspect or implementation, it will be understood that such features, structures, or characteristics may be included with other aspects or implementations, whether or not explicitly described. Thus, various changes and modifications may be made to the preceding disclosure without departing from the scope or spirit of the inventive concept, and the specification and drawings should therefore be regarded as exemplary only, with the scope of the invention determined solely by the appended claims.

What is claimed is:

1. A method for optimizing a basis vector set for use in reducing dimensionality of hyperspectral images, comprising:

receiving a hyperspectral image having a plurality of pixels;

establishing an initial basis vector set from the received hyperspectral image that includes a predetermined number of members, wherein each of the members comprises a basis vector; and for each of the plurality of pixels:

reading a spectral vector for a subject pixel;

decomposing the spectral vector for the subject pixel with members of a current basis vector set to derive a residual vector for the subject pixel, wherein the initial basis vector set being the current basis vector set with which to decompose the spectral vector for an initial one of the plurality of pixels;

adding a basis vector for the subject pixel to the members of the current basis vector set when the residual vector for the subject pixel has a magnitude exceeding a predetermined threshold; and optimizing the current basis vector set and the added basis vector, wherein the optimized basis vector set includes the predetermined number of members.

2. The method of claim 1, wherein optimizing the current basis vector set and the added basis vector includes:

decomposing the members of the current basis vector set to determine a direction having a minimum power variance; and eliminating a member of the current basis vector set that is closest to the determined direction, resulting in the optimized basis vector set.

3. The method of claim 1, wherein optimizing the current basis vector set and the added basis vector includes:

constructing a predetermined number of candidate basis vector sets that include the predetermined number of members, wherein the predetermined number of candidate basis vector sets equals the predetermined number of members, and wherein each member of the current basis vector set is left out of one of the candidate basis vector sets;

deriving a residual vector for the member left out of each respective candidate basis vector set; and eliminating a member of the current basis vector set associated with the residual vector having a smallest magnitude, resulting in the optimized basis vector set.

4. The method of claim 1, wherein optimizing the current basis vector set and the added basis vector includes determining a root sum square for a plurality of fitting coefficients associated with each of the members of the current basis vector set, wherein the optimized basis vector set includes the predetermined number of members for which the determined root sum square is largest.

5. The method of claim 1, wherein optimizing the current basis vector set and the added basis vector includes determining a magnitude for a plurality of fitting coefficients associated with each of the members of the current basis vector set, wherein the optimized basis vector set includes the predetermined number of members for which the determined magnitude is largest.

* * * * *